March 21, 1961 L. L. REED ET AL 2,975,920
MACHINE FOR REMOVING BAKED GOODS AND THE LIKE FROM PANS
Filed June 9, 1958 3 Sheets-Sheet 1

INVENTOR.
Linwood L. Reed
Jack W. McKim
BY
ATTORNEY.

March 21, 1961   L. L. REED ET AL   2,975,920
MACHINE FOR REMOVING BAKED GOODS AND THE LIKE FROM PANS
Filed June 9, 1958   3 Sheets-Sheet 2

INVENTOR.
Linwood L. Reed
Jack W. McKim
BY
ATTORNEY.

March 21, 1961  L. L. REED ET AL  2,975,920
MACHINE FOR REMOVING BAKED GOODS AND THE LIKE FROM PANS
Filed June 9, 1958  3 Sheets-Sheet 3
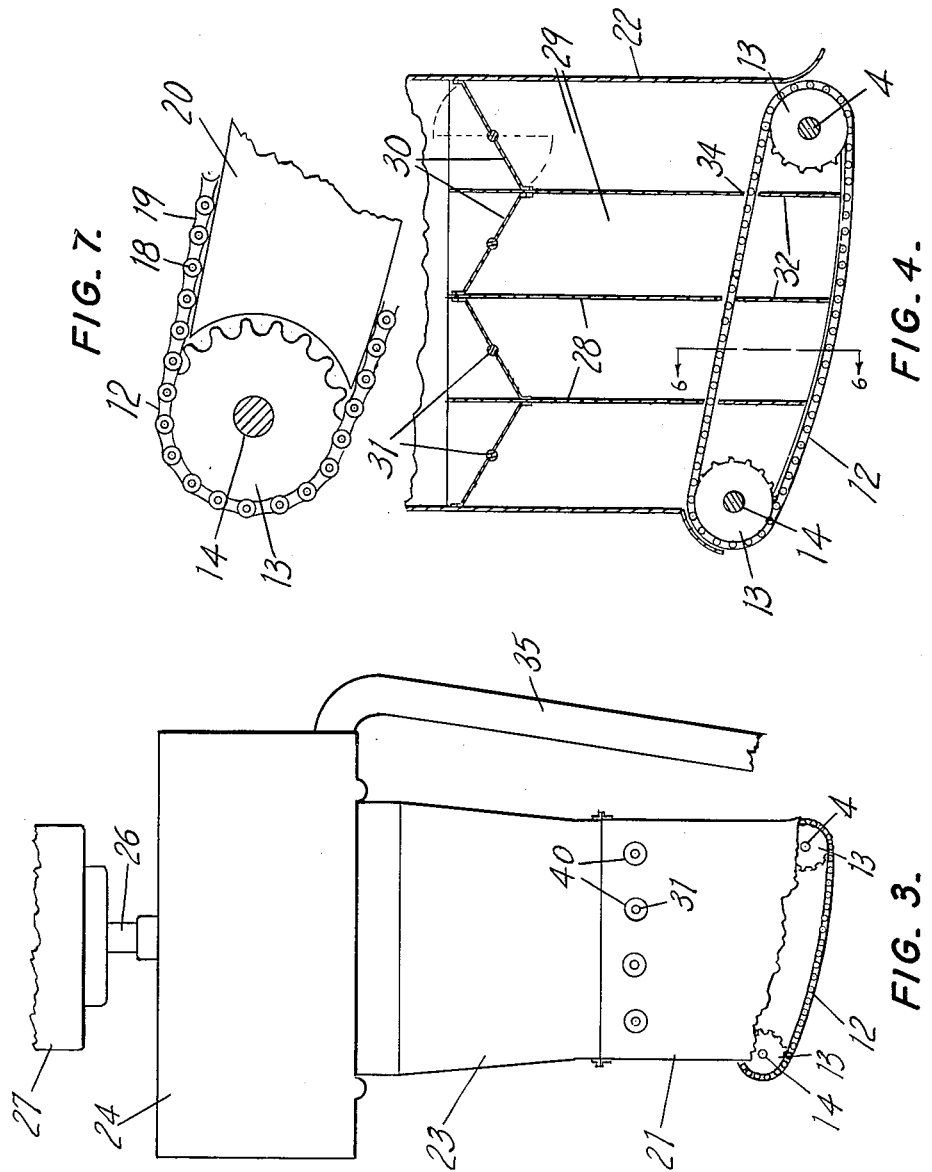
INVENTOR.
Linwood L. Reed
Jack W. McKim
BY
ATTORNEY.

United States Patent Office 2,975,920
Patented Mar. 21, 1961

2,975,920
MACHINE FOR REMOVING BAKED GOODS AND THE LIKE FROM PANS

Linwood L. Reed and Jack W. McKim, Albion, Mich., assignors to Union Steel Products Company, Albion, Mich.

Filed June 9, 1958, Ser. No. 740,630
6 Claims. (Cl. 214—309)

This invention relates to a machine or apparatus adapted for the removal of baked goods and the like from pans.

The main objects of this invention are:

First, to provide an apparatus or machine adapted for removing baked goods from pans which is effective for the purpose and avoids any manual handling of the goods.

Second, to provide a machine adapted for the purpose indicated which is relatively compact and portable.

Third, to provide a machine for removing baked goods and the like from pans which is of large capacity and at the same time does not in any wise injure or disfigure the product.

Fourth, to provide a machine having the above stated advantages which is relatively simple in structure and readily adjusted or adapted to products, for example, baked goods varying substantially in height.

Objects relating to details and economies of the invention will appear from the description to follow. The invention is defined and pointed out in the claims.

A preferred embodiment of the invention is illustrated in the accompanying drawing, in which:

Fig. 2 is a fragmentary front elevational view, a fragment only of the feed conveyor being illustrated, a portion of the front wall of the suction chamber being omitted and the pick up conveyor being shown in its operative relation to a pan containing baked goods or the like.

Fig. 3 is a conventionalized fragmentary side elevational view illustrating the suction chamber, the suction fan housing and the pick up conveyor.

Fig. 4 is an enlarged fragmentary vertical section corresponding to that of Fig. 1 showing details of the suction chamber and the relation of the pick up conveyor thereto.

Fig. 7 is an enlarged fragmentary view on a line corresponding to line 7—7 of Fig. 6, fragments of the conveyor and one of the supporting members for the reaches thereof being illustrated.

Figure 1:
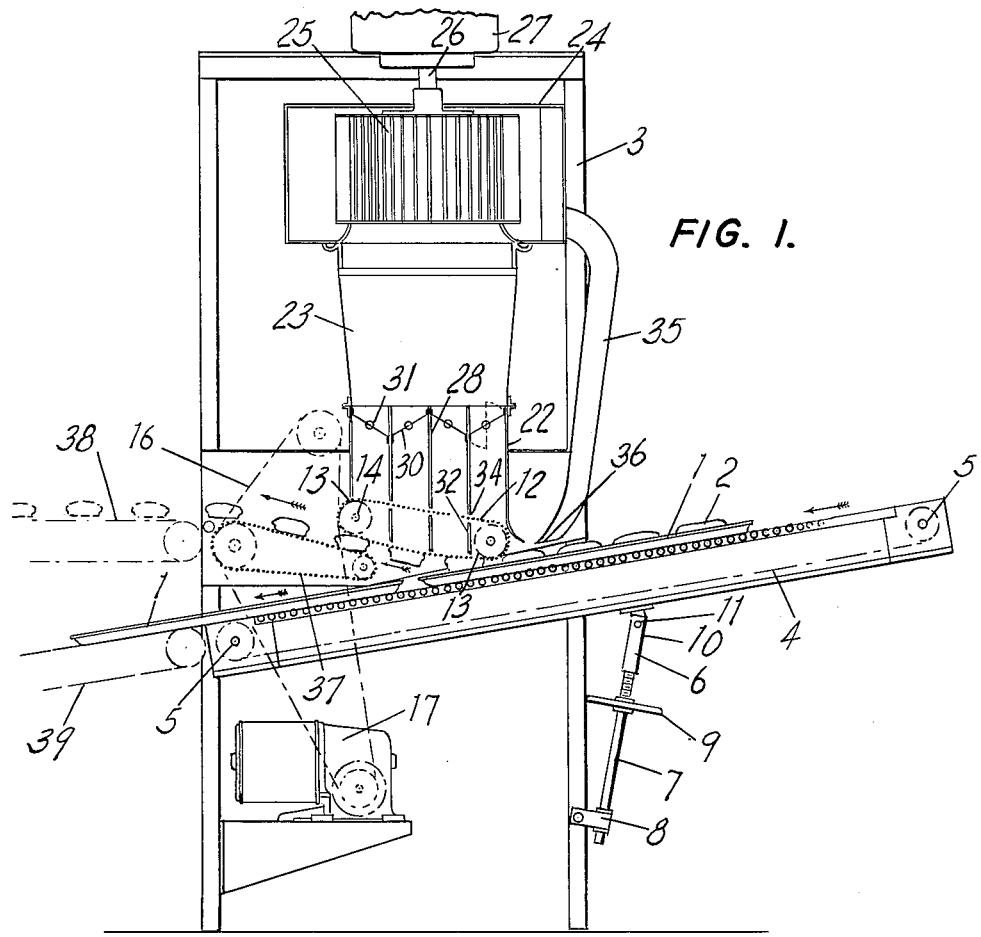
Fig. 1 is a fragmentary side elevational view of a machine embodying our invention partially in vertical section on a line corresponding to line 1—1 of Fig. 2, the section lines however being omitted in view of the reduced dimensions. The operative relation of the several elements and parts to products being mainly illustrated conventionally.
Figure 6:
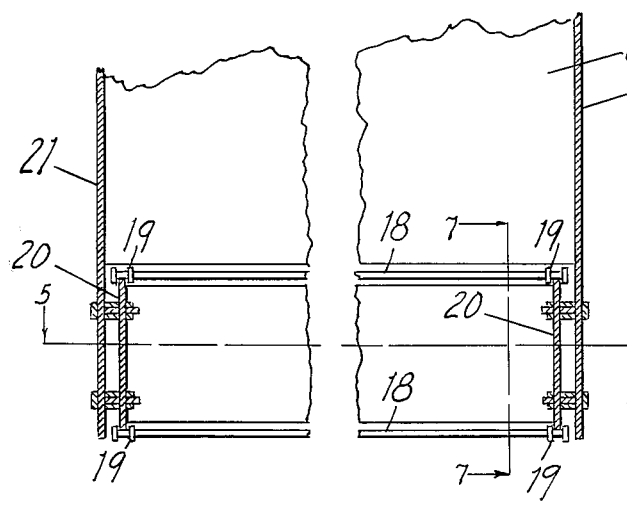
Fig. 6 is a fragmentary view in vertical section on a line 6—6 corresponding to that of Fig. 4.
Figure 2:
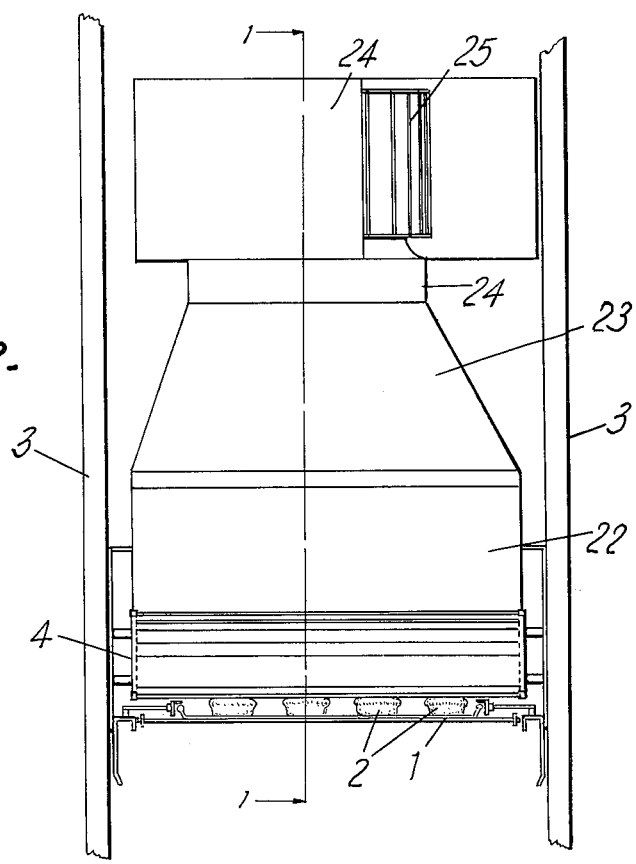
Figure 5:
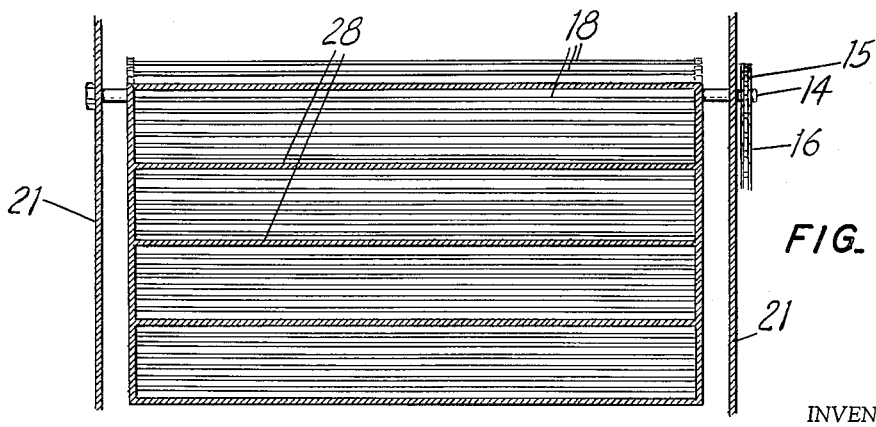
Fig. 5 is a fragmentary view partially in section on a line corresponding to line 5—5 of Fig. 6, a fragment only of the conveyor being illustrated.

The embodiment of our invention illustrated is particularly designed and adapted for removing of baked goods such, for example, as buns from a baking pan 1 which is conventionally illustrated, the buns or baked goods 2 also being conventionally illustrated. It will be understood that in the accompanying drawings the various parts are shown mainly conventionally and the details thereof may be varied and are not a part of this invention.

The frame designated generally by the numeral 3, is conventionally illustrated but it is desirably a portable frame, that is, one that can be moved about from place to place as, for example, from one oven to another or from one cooling apparatus to another as occasion may require.

The embodiment of our invention illustrated comprises a feed conveyor designated generally by the numeral 4 which is pivotally mounted on the frame at 5, the adjustable strut 6 supporting the front end thereof. This strut comprises a member 7 rotatably supported on the frame at 8 and provided with a hand wheel 9. The strut member 7 has threaded engagement with the member 10 which is pivoted at 11 to the underside of the conveyor frame. This conveyor is adapted to receive the pans 1 and convey them to operative relation to the pick up conveyor designated generally by the numeral 12. This conveyor, see Fig. 4, comprises the sprocket wheels 13, the shaft 14 of the rear sprocket being provided with a gear 15 which is driven from the chain 16 and motor 17 mounted on the frame.

This pick up conveyor consists of a plurality of rods 18 connected by the links 19. The top and bottom reaches of this conveyor between the sprockets 13 are supported and guided by the edges of the vertically disposed guide members 20. The pick up conveyor is disposed between the side wall 21 of the suction chamber 22, this suction chamber has an extension 23 which is connected to the casing 24 of the suction fan or blower 25 which, in the embodiment illustrated, is supportedly connected to the vertical shaft 26 of the motor 27.

The suction chamber is provided with a plurality of partitions 28 extending transversely relative to the pick up conveyor and providing a plurality of suction passages 29, each suction passage being provided with a valve 30. The valves are provided with pivots or spindles 31 which are provided with hand wheels 40 disposed on the outer side of the suction chamber so that the valves may be individually adjusted to control the suction of each passage.

In the drawings the valves are illustrated in closed position but the open position of one of the valves is indicated by dotted lines in Figs. 1 and 4. It will be understood that in practice the valves may all be fully opened or they may be opened to the same or varying degrees. The purpose of the several passages is to regulate suction as may be required or desirable to pick up the products from the pans and hold the products on the rearwardly traveling reach of the pick up conveyor as is illustrated in Fig. 1.

The suction chamber partitions 28 have portions 32 disposed between the reaches of the pick up conveyor as is best illustrated in Fig. 4. The partitions are, in effect, sectioned and the sections spaced to provide openings 34 therein for the upper or forwardly traveling reach of the pick up conveyor.

With this arrangement the partitions forming the separate suction conduits extend transversely of the path of travel of the pick up conveyor, the products such as baked food products, most of which have some tendency to adhere to the pans, are freed therefrom and carried along by the rearwardly traveling under reach of the pick up conveyor. As not as much suction is required to carry the picked up products as is required to loosen the same from the pans the partitions providing separate suction passages do form a very important function and each is provided with an independently adjustable valve so that the operator can regulate the same as may be required for particular products or conditions.

To aid the pick up conveyor in freeing the products from the pan we provide a conduit 35 having a discharge nozzle 36 extending transversely of the pan and discharging thereon adjacent the front end of the pick up conveyor. This is somewhat conventionally shown in Fig. 1 of the drawing and is connected to the housing 24 of the blower or suction producing fan 25.

The discharge conveyor 37 is disposed in forwardly and downwardly inclined relation at its front end below the rear end of the pick up conveyor as is shown in Fig. 1. As the picked up products are relieved of the suction of the suction chamber they fall upon the discharge conveyor which in turn delivers to a delivery conveyor conventionally shown at 38.

The drive chains 16, in the embodiment illustrated, are adapted to drive both the pick up and discharge conveyors, however, these parts are only shown conventionally as any suitable drive means may be provided and this particular drive means does not constitute a part of this invention. The same comments apply to the drive of feed conveyor 39 which is conventionally illustrated in Fig. 1.

The machine of our invention quite commonly designated as a "depanner" is highly efficient and at the same time very compact in proportion to its capacity. As stated, we have illustrated several of the parts mainly conventionally but it is believed this disclosure made will enable those skilled in the art to embody or adapt our invention as may be desired for particular products and the like.

Having thus described the invention, what is claimed as new and desired to secure by Letters Patent is:

1. A machine for removing products from pans comprising a supporting frame, a downwardly and rearwardly inclined feed conveyor pivotally mounted at its rear end on said frame, manually adjustable supporting means for the front end of said conveyor, a walled suction chamber open at its lower end disposed above and in vertically spaced relation to said feed conveyor, said suction chamber being of generally rectangular horizontal section and having a plurality of partitions extending transversely thereof providing a plurality of suction passages, a foraminate pick up conveyor disposed above said feed conveyor with its front end adjacent but vertically spaced therefrom and including driving and supporting sprockets, said pickup conveyor being disposed mainly within said suction chamber with its lower reach in substantially the plane of the lower edges of opposed walls of said suction chamber, said suction chamber partitions having openings therein through which the upper reach of the pick up conveyor is disposed, plate-like supports disposed between the driving and supporting sprockets of the conveyor in supporting and guiding relation to the upper and lower conveyor reaches thereof, independently adjustable valves for said suction passages disposed therein above said pick up conveyor, a discharge conveyor disposed above said feed conveyor with its forward end below the rear end of said pick up conveyor and spaced therefrom to receive products released from said pick up conveyor as a result of the breaking of the suction hold thereon.

2. A machine for removing products from pans comprising a supporting frame, a downwardly and rearwardly inclined feed conveyor pivotally mounted at its rear end on said frame, manually adjustable supporting means for the front end of said conveyor, a walled suction chamber open at its lower end disposed above and in vertically spaced relation to said feed conveyor, a foraminate pick up conveyor of the belt type including driving and supporting sprockets disposed above said feed conveyor with its front end adjacent but vertically spaced therefrom, said pick up conveyor being disposed mainly within said suction chamber with its lower reach in substantially the plane of the lower edges of opposed walls of said suction chamber, plate like supports disposed between the driving and supporting sprockets of the conveyor in supporting and guiding relation to the upper and lower conveyor reaches thereof, a discharge conveyor disposed above said feed conveyor with its forward end below the rear end of said pick up conveyor and spaced therefrom to receive products released from said pick up conveyor as a result of the breaking of the suction hold thereon.

3. A machine for removing products from pans comprising a supporting frame, a downwardly and rearwardly inclined feed conveyor pivotally mounted at its rear end on said frame, manually adjustable supporting means for the front end of said conveyor, a walled suction chamber open at its lower end disposed above and in vertically spaced relation to said feed conveyor, a foraminate pick up conveyor of the belt type including driving and supporting sprockets disposed above said feed conveyor with its front end adjacent but vertically spaced therefrom, said pickup conveyor being disposed mainly within said suction chamber with its lower reach in substantially the plane of the lower edges of opposed walls of said suction chamber, plate-like supports disposed between the driving and supporting sprockets of the conveyor in supporting and guiding relation to the upper and lower conveyor reaches thereof, a discharge conveyor disposed above said feed conveyor with its forward end below the rear end of said pick up conveyor and spaced therefrom to receive products released from said pick up conveyor as a result of the breaking of the suction hold thereon, a suction means mounted on said frame and operatively connected to said suction chamber, and a nozzle connected to said suction means and disposed to discharge a stream of air under pressure downwardly at the front end of and closely adjacent to the front end of said pick up conveyor to aid in releasing products from pans translated on said feed conveyor below said pick up conveyor.

4. A machine for removing products from pans comprising a feed conveyor, a suction chamber open at its lower end disposed above and in vertically spaced relation to said feed conveyor and having a plurality of valved suction passages, a pick up conveyor disposed mainly within and subject to the suction within said suction chamber with the lower reach thereof in approximately the plane of the lower edge of opposed walls of the suction chamber, a discharge conveyor disposed with its forward end below the rear end of said pick up conveyor to receive products discharged therefrom, suction means operatively associated with said suction chamber, and a nozzle connected to said suction means and disposed to discharge a stream of air under pressure closely adjacent to the front end of said suction conveyor means in releasing products from the pans.

5. A machine for removing products from pans comprising a pan feed support means, a walled suction chamber open at its lower end disposed above and in vertically spaced relation to said pan feed support means, said suction chamber being of generally rectangular horizontal section and having a plurality of partitions extending transversely thereof providing a plurality of suction passages, a foraminous pick up conveyor of the belt type disposed above said pan support means with its front end adjacent but vertically spaced therefrom, said pick up conveyor including driving and supporting sprockets, said pick up conveyor being disposed within said suction chamber with its lower reach in substantially the plane of the lower edges of the walls of said suction chamber, said suction chamber partitions having openings therein through which the upper reach of the pick up conveyor is disposed, independently adjustable valves for said suction passages disposed therein above said pick up conveyor, a discharge conveyor disposed with its forward end below the rear end of said pick up conveyor to receive products released from said pick up conveyor.

6. A machine for removing products from pans comprising a pan feed support means, a walled suction chamber open at its lower end disposed above and in vertically spaced relation to said pan feed support means, a foraminous pick up conveyor of the belt type disposed above said pan support means with its front end adjacent but vertically spaced therefrom, said pick up conveyor including driving and supporting sprockets, said pick up conveyor being disposed within said suction chamber with its lower reach in substantially the plane of the lower edges of the walls of said suction chamber, a discharge conveyor disposed with its forward end below the rear end of said pick up conveyor to receive products released from said pick up conveyor, a suction means mounted on said frame and operatively connected to said suction chamber, and a nozzle connected to said suction means and disposed to discharge a stream of air under pressure at the front end of and closely adjacent to the front end of said suction conveyor to assist in releasing products from the pans advanced thereto.

References Cited in the file of this patent
UNITED STATES PATENTS

| | | |
|---|---|---|
| 1,377,136 | Lawrence et al. | May 3, 1921 |
| 2,213,774 | Taylor | Sept. 3, 1940 |
| 2,271,937 | Engles | Feb. 3, 1942 |
| 2,680,615 | Edgar | June 8, 1954 |